United States Patent [19]

Chielens et al.

[11] 4,108,410
[45] Aug. 22, 1978

[54] SUPPORT DEVICE FOR A CYLINDRICAL ROTARY MEMBER

[75] Inventors: Alain Chielens, Marcq-en-Baroeul; Gérard Marchal, Hellemmes; Michel Gesquiere, Lille, all of France

[73] Assignee: Fives-Cail Babcock, Paris, France

[21] Appl. No.: 786,280

[22] Filed: Apr. 11, 1977

[51] Int. Cl.² .......................................... F16C 13/06
[52] U.S. Cl. ...................................... 248/130; 308/73
[58] Field of Search .................. 248/130; 211/164; 308/73; 259/81

[56] References Cited

U.S. PATENT DOCUMENTS

| | | | |
|---|---|---|---|
| 1,331,739 | 2/1920 | Becker | 248/130 |
| 2,363,260 | 11/1944 | Peskin | 308/73 |
| 2,768,033 | 10/1956 | Morris | 308/73 |
| 2,770,270 | 11/1956 | Ottersland | 248/130 |
| 3,053,587 | 9/1962 | Wallgren | 308/73 |
| 3,063,762 | 11/1962 | Hirtz | 308/73 |

FOREIGN PATENT DOCUMENTS

| | | | |
|---|---|---|---|
| 1,174,429 | 12/1969 | United Kingdom | 308/73 |
| 944,584 | 12/1963 | United Kingdom | 308/73 |
| 1,016,983 | 10/1957 | Fed. Rep. of Germany | 308/73 |

Primary Examiner—Marion Parsons, Jr.
Attorney, Agent, or Firm—Kurt Kelman

[57] ABSTRACT

The rotary tube of a crusher is mounted for rotation on a support having a support surface in gliding contact with a circumferentially extending, circular face portion of the crusher tube. The support is supported on a ball-and-socket joint in turn supported on a base, the ball of the joint being affixed to the support and the socket being affixed to the base. A cheek plate extends from each side of the support and encloses the joint and a portion of the base so as to restrain lateral movement of the support.

11 Claims, 2 Drawing Figures

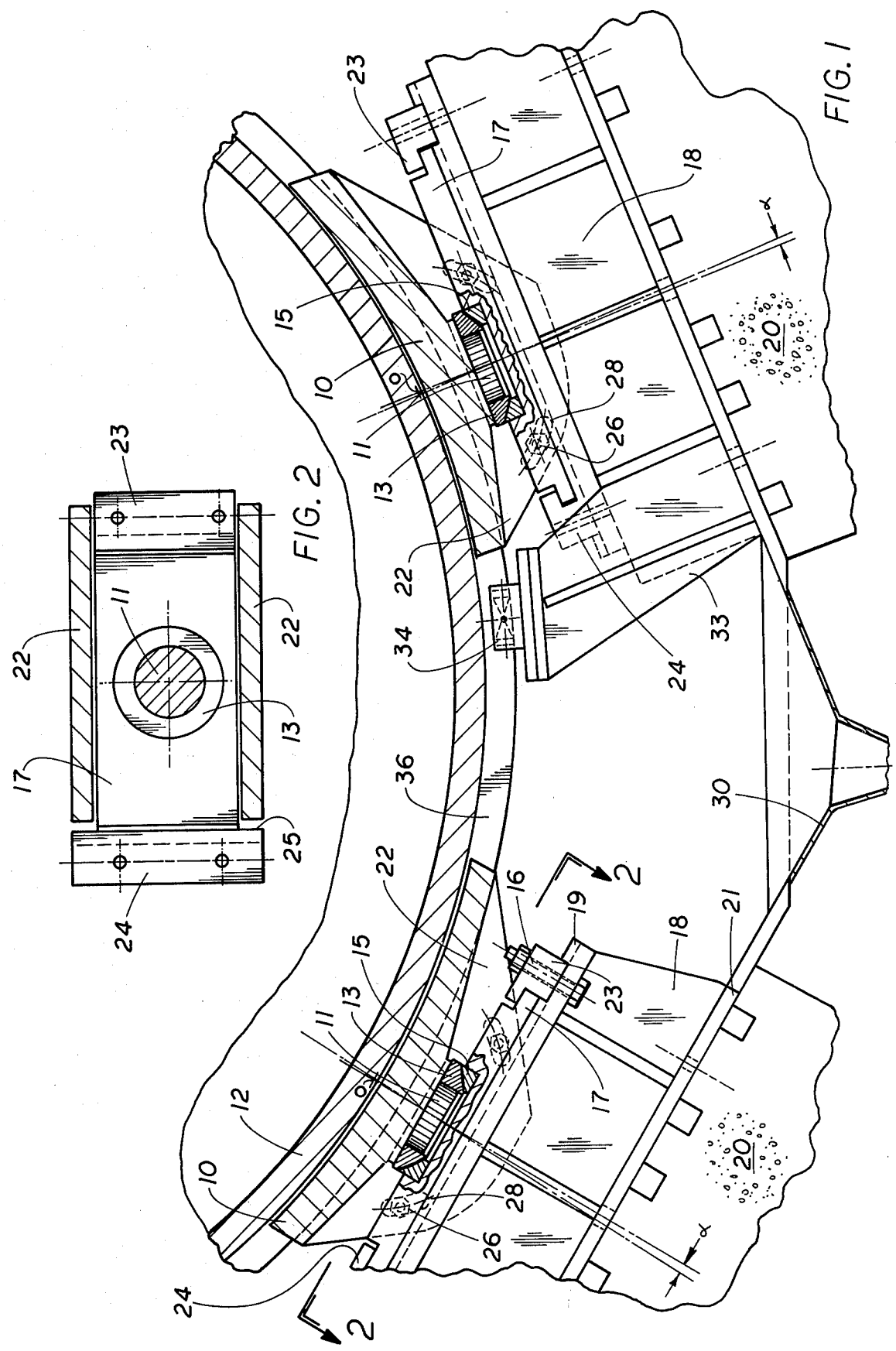

SUPPORT DEVICE FOR A CYLINDRICAL ROTARY MEMBER

The present invention relates to a support device for glidably supporting a cylindrical member of large diameter, such as the rotary tube of a crusher, arranged on the support device for rotation about an axis of the member which has a circumferentially extending, circular face portion in gliding contact with a support surface of the support to support the cylindrical member during rotation. Two sides of the support surface extend in the direction of the circular face portion and define the length of the support whose width extends transversely of the circular face portion which extends concentrically about the axis.

In support devices of this type, the support is supported on a ball-and-socket joint for universal or swivel movement of the support.

In operation, oil is introduced under low pressure at the upstream end of the support, as determined by the direction of rotation of the cylindrical member, so as to maintain an antifriction film having a hydrodynamic effect between the support surface of the support and the circular face portion of the cylindrical member in gliding contact therewith. To maintain a regular and even oil film over the entire support surface and to avoid deterioration of the support or the circular face portion of the cylindrical member, the rigidity of the support must be adapted or equal to that of the face portion.

Usually, this condition has been fulfilled by making the supports rather thick and limiting their circumferential length. If the cylindrical rotary member is heavy and of large diameter, this requires more than two supports. This poses problems with respect to the equal distribution of the load over all the supports.

Furthermore, to obtain as uniform a pressure distribution as possible over the entire width of the supports, it is preferred to use ball-and-socket joints of small diameter whose center of rotation is located at the gliding surface of the support or close thereto. This limits the thickness of the support.

It is the primary object of this invention to adapt the rigidity of the support to that of the face portion of the cylindrical member it supports for rotation, regardless of the length and thickness of the support, to make it possible to support very heavy cylindrical members of large diameter with only two supports, and to use ball-and-socket joints of small diameter for carrying the supports.

The above and other objects and advantages are accomplished in accordance with the invention by extending a cheek plate from each of the support sides and enclosing the joint and a portion of a base supporting the joint, one of the joint parts being affixed to the support and the other joint part being affixed to the base. The cheek plates restrain lateral movement of the support and are so configured in cross section and shape that the rigidity of the support is adapted to that of the circumferentially extending, circular face portions of the cylindrical member.

The above and other objects of the present invention will become more apparent from the following detailed description of a now preferred embodiment, taken in conjunction with the accompanying drawing wherein FIG. 1 is a partial end view, partly in vertical cross section, of a support device according to this invention; and FIG. 2 is a section along line 2—2 of FIG. 1.

Referring now to the drawing, there is shown the lower part only of rotary member 12 of large diameter, such as a tubular crusher. The support device for this member comprises a pair of like supports 10 each having a support surface in gliding contact with a circumferentially extending, circular face portion of member 12. The support surfaces and circular face portion are concentric with the axis of rotation of cylindrical member 12. The support faces each have two sides extending in the circumferential direction of the circular face portion and defining the length of the supports. The length of the supports has a ratio of about 2:1 to the width thereof extending in a direction perpendicular to the length.

A two-part ball-and-socket joint supports each support for universal movement. Each joint is comprised of a ball part including stem 11 mounted in a bore of annular element 13 and affixed to support 10 and a socket part 15 on which the ball part swivels. Center O of the spherical surfaces of the ball and socket parts is located in or close to the support surface. The radius of the ball-and-socket joint is between 0.35 and 0.5 times the width of support 10.

Base 17 supports the ball-and-socket joint, socket part 15 of the joint being affixed to the base. In the illustrated embodiment, the base is removably mounted on carrier frame 18 by means of clamping brackets 23 and 24 each having a flange portion engaging a respective shoulder at the ends of base 17. The clamping brackets are movably held on metallic carrier frame 18 by bolts 16, loosening of the bolts and the clamping brackets enabling the base to be removed. As shown, metallic carrier 18 has upper bed plate 19 carrying base 17 and lower bed plate 21 resting on concrete base support 20, the two bed plates being parallel to each other.

As shown, the concrete base support has a pair of inclined support surfaces each having an inclination equal to or about equal to the inclination of a plane perpendicular to the radius of cylindrical member 12 passing through center O of the respective ball-and-socket joint of each support 10, the supports being arranged at respective sides of a vertical plane passing through the axis of rotation of the cylindrical member. This disposition makes it possible to disengage each support by loosening the clamping brackets and sliding base 17 on bed plate 19 after cylindrical member 12 has been propped up suitably and without the necessity of removing it.

Metallic carrier 18 is of relatively small height and, consisting of two bed plates, is relatively inexpensive. As shown in FIG. 1, the supports may be arranged asymmetrically with respect to the vertical plane passing through the axis of cylindrical member 12 to take into account the asymmetric nature of this member, as is the case in a rotary kiln or a rotary crusher.

Oil sump 30 is welded to the edges of lower bed plates 21 between the supports to receive lubricating oil flowing from the supports during operation.

According to the present invention, cheek plates 22 extend from each side of supports 10 and enclose the ball-and-socket joints and a portion of bases 17 whereby the rigidity of the supports is enhanced. The cheek plates extend in two planes perpendicular to the support surfaces of the supports and, as appears from FIG. 1, the height of the cheek plates increases inwardly from the ends of the cheek plates towards the center of the supports, the cheek plates being configurated to take into account the distribution of pressures on supports 10 during operation so that the curvatures of the gliding surfaces of the supports and the cylindrical member are equalized when they are deformed under a load. As illustrated in FIG. 2, there is a slight play between cheek plates 22 and the adjoining side edges of base 17 to permit supports 10 to orient themselves freely within the limits imposed by the operating conditions.

As also shown in FIG. 2, clamping bracket 24 constitutes abutment 25 arranged for cooperation with cheek plates 22 for limiting any circumferential displacement of support 10 if the same should be accidentally entrained by rotating member 12, for instance when the lubricating system fails or the gliding surfaces have deteriorated so that they no longer mate. The abutments are spaced slightly from the rear edges of the cheek plates, as viewed in the direction of rotation of cylindrical member 12, the rear edge portions being arcuate and the center of the circular arc of the rear edge portions of the cheek plates being located on an axis passing through center O of the ball-and-socket joint and being perpendicular to the planes of the cheek plates. In this way, the cheek plates will not contact the abutments when support 20 swivels on the joint.

Base 17 and cheek plates 22 are interconnected by a pin-and-slot connection permitting limited pivoting of support 10 with respect to the base. In the illustrated embodiment, pins 26 are affixed to the side edges of base 17 and project therefrom into engagement with elongated slots 28 in the cheek plates of the supports. The slots are arcuate and their circle of curvature has the same center as the ball-and-socket joint so as to permit a limited swivel motion between the support and base. This arrangement enables the base and support to be handled as a unit after the base has been removed from carrier 18.

Bracket 33 extends from one of the metallic carriers 18 and carries guide support 34 which cooperates with circumferentially extending flanges 36 affixed to cylindrical member 12. If desired, the side support may be mounted on the bed plate of the carrier. The cooperating guide support and flange 36 will absorb axial forces to which the cylindrical member may be subjected during rotation.

What we claim is:

1. A support device for glidably supporting a cylindrical member of large diameter arranged on the support device for rotation about an axis of the member and having a circumferentially extending, circular face portion, comprising
   (a) a support having a support surface in gliding contact with the circular face portion to support the cylindrical member, two sides of the support surface extending in the circumferential direction of the circular face portion and defining the length of the support,
   (b) a two-part ball-and-socket joint supporting the support for universal movement,
   (c) a base supporting the joint, one of the joint parts being affixed to the support and the other joint part being affixed to the base, and
   (d) a cheek plate integral with the support and extending from each of the support sides, the cheek plates enclosing the joint and a portion of the base whereby lateral movement of the support is restrained, and the cheek plates being configurated to stiffen the support and adapt the rigidity of the support to that of the circular face portion.

2. The support device of claim 1, wherein the radius of the ball-and-socket joint is between 0.35 and 0.5 times the width of the support, the center of the joint being located in the support surface or close thereto and the length of the support exceeding the width thereof.

3. The support device of claim 1, wherein the ratio of the length of the support to the width thereof is about 2:1.

4. The support device of claim 1, further comprising abutments arranged for cooperation with the cheek plates for limiting any circumferential displacement of the support.

5. The support device of claim 4, wherein the cheek plates have arcuate edge portions cooperating with the abutments, the center of the arcuate edge portions being located on an axis passing through the center of the ball-and-socket joint and being perpendicular to the planes of the cheek plates.

6. The support device of claim 4, wherein the abutments are arranged on the base.

7. The support device of claim 1, further comprising a planar base support having an inclined support surface whereon the base is detachably mounted, the inclination of the support surface of the base support being equal to or about equal to the inclination of a plane perpendicular to the radius of the cylindrical member passing through the center of the ball-and-socket joint.

8. The support device of claim 1, wherein the base and cheek plates are interconnected by a pin-and-slot connection permitting limited pivoting of the support with respect to the base.

9. The support device of claim 1, comprising a pair of said supports supported on respective ones of the ball-and-socket joints supported on respective ones of said bases, the supports being arranged at respective sides of a vertical plane passing through the axis of the cylindrical member, a concrete base support having a pair of inclined support surfaces each having an inclination equal to or about equal to the inclination of a plane perpendicular to the radius of the cylindrical member passing through the center of the respective ball-and-socket joint, a metallic carrier mounted on each of the inclined support surfaces, and the bases being removably mounted on respective ones of the metallic carriers.

10. The support device of claim 9, further comprising an oil sump affixed to the metallic carriers between the bases.

11. A support device for glidably supporting a cylindrical member of large diameter arranged on the support device for rotation about an axis of the member and having a circumferentially extending, circular face portion, comprising
   (a) a pair of supports arranged at respective sides of a vertical plane passing through the axis of the cylindrical member,
      (1) each of the supports having a support surface in gliding contact with the circular face portion to support the cylindrical member, two sides of the support surface extending in the circumferential direction of the circular face portion and defining the length of the support,
   (b) a two-part ball-and-socket joint supporting each one of the supports for universal movement,
   (c) a base supporting each one of the ball-and-socket joints, one of the joint parts of each joint being affixed to a respective one of the supports and the other joint part of each joint being affixed to a respective one of the bases,
(d) a cheek plate integral extending from each side of each one of the supports and integral therewith, the cheek plates of each support enclosing a respective one of the joints and a portion of a respective one of the bases whereby lateral movement of each support is restrained, and the cheek plates being configurated to stiffen the supports and to adapt the rigidity of the supports to that of the circular face portion,
(e) a concrete base support having a pair of inclined support surfaces each having an inclination equal to or about equal to the inclination of a plane perpendicular to the radius of the cylindrical member passing through the center of a respective one of the joints,
(f) a metallic carrier mounted on each of the inclined support surfaces of the concrete base support, the bases being removably mounted on respective ones of the metallic carriers,
(g) circumferentially extending flanges affixed to the cylindrical member, and
(h) a guide element cooperating with the flanges and affixed to one of the metallic carriers, the cooperating guide elements and flanges absorbing axial forces to which the cylindrical member is subjected during rotation.

* * * * *

UNITED STATES PATENT AND TRADEMARK OFFICE
CERTIFICATE OF CORRECTION

PATENT NO. : 4,108,410
DATED : Aug. 22, 1978
INVENTOR(S) : Alain Chielens et al

It is certified that error appears in the above-identified patent and that said Letters Patent are hereby corrected as shown below:

In the title page, between [22] and [51], insert:--
[30]  Foreign Application Priority Data
  Apr. 9, 1976  France ................ 76/10388

Signed and Sealed this

Thirteenth Day of March 1979

[SEAL]

Attest:

RUTH C. MASON
Attesting Officer

DONALD W. BANNER
Commissioner of Patents and Trademarks